United States Patent [19]

Taylor

[11] Patent Number: 4,799,506
[45] Date of Patent: Jan. 24, 1989

[54] ADJUSTABLE SAFETY RELIEF VALVE

[76] Inventor: Wesley L. Taylor, 7417 NW. 19th St., Bethany, Okla. 73008

[21] Appl. No.: 148,080

[22] Filed: Jan. 25, 1988

Related U.S. Application Data

[63] Continuation of Ser. No. 52,685, May 20, 1987, abandoned, which is a continuation of Ser. No. 800,992, Nov. 22, 1985, abandoned.

[51] Int. Cl.$^4$ .............................................. F16K 17/06
[52] U.S. Cl. .................................... 137/469; 137/542
[58] Field of Search ........... 137/469, 476, 477, 516.29, 137/522, 542

[56] References Cited

U.S. PATENT DOCUMENTS

| | | | |
|---|---|---|---|
| 303,252 | 8/1884 | Ashton | 137/542 X |
| 620,936 | 3/1899 | Kunzer | 137/542 X |
| 2,588,157 | 3/1952 | Olson . | |
| 2,676,782 | 4/1954 | Bostock et al. . | |
| 2,860,662 | 11/1958 | Gres et al. . | |
| 2,875,978 | 3/1959 | Kmiecik . | |
| 2,878,896 | 3/1959 | Farrell . | |
| 3,123,092 | 3/1964 | Kmiecik | 137/469 |
| 3,189,040 | 6/1965 | Johnson . | |
| 3,741,523 | 6/1973 | Scaramucci et al. . | |
| 3,754,568 | 8/1973 | Gallagher et al. . | |
| 3,945,607 | 3/1976 | Dashner | 137/542 X |
| 4,432,389 | 2/1984 | Jackson | 137/469 |
| 4,446,886 | 5/1984 | Taylor et al. . | |

OTHER PUBLICATIONS

"Series 300, 400 and 500: Three Standardized Safety Relief Valves for Non-Standard Processes." (3 pp.), (Cover Page and pp. 3 and 15 from Catalog No. 304, Crosby Valve Division Geosource.)
"Consolidated 1990 Series Safety Relief Valve." (2 pp.) (Cover sheet and p. 9 from Bulletin SRV-4 Industrial Valve Division, Dresser Industries.).
"Carbon Steel Metal Seats." (1 p.) (p. 9 from Anderson Greenwood Company Catalog.).
"Teledyne Farris Safety-Relief Valves." (1 p.) (p. 5.02 including Valve Descriptions.).
"For Sour Gas Service-1900 Series XSG", (1 p.) (p. 2-21 from a Consolidated Catalog.).
"7800 & 7900 Safety Relief Valves." (12 pp.) (From Taylor Tools.).
"Type 8000 Safety Relief Valves." (2 pp.) (Bulletin 8000-84A from Taylor Tools.).

Primary Examiner—Martin P. Schwadron
Assistant Examiner—Stephen M. Hepperle
Attorney, Agent, or Firm—Willian Brinks Olds Hofer Gilson & Lione Ltd.

[57] ABSTRACT

An adjustable pressure relief valve is disclosed comprising a valve body having an inlet and an outlet, a valve seat associated with the inlet, a valve member configured to seal off the flow of fluids through the valve at the valve seat, an adjustment screw supported in the valve body to allow rotational but not longitudinal movement of the adjustment screw with respect to the valve body, a compression member connected to the adjustment screw and mounted within the valve body which moves longitudinally with respect to the adjustment screw when the adjustment screw is rotated and a resilient member biased between the compression member and the valve member. In the preferred embodiments, a connection between the adjustment screw and the valve member aligns the valve member with the valve seat. Also, the adjustment screw provides an unchanging stop surface to limit the lift of the valve seat as well as inside diameter guiding to prevent buckling of a helical spring used as the resilient member.

15 Claims, 3 Drawing Sheets

ADJUSTABLE SAFETY RELIEF VALVE

This application is a continuation of application Ser. No. 07/052,685, filed May 20, 1987, which in turn is a continuation of application Ser. No. 06/800,992, filed Nov. 22, 1985, both now abandoned.

BACKGROUND OF THE INVENTION

The present invention relates to safety relief valves and to adjustable set pressure safety relief valves in particular.

Safety relief valves are commonly used on pressure vessels and pipelines to relieve temporary pressures in excess of the safe pressure the vessel or pipeline can withstand. Most often a relief valve is built with a range of relief pressures to which it may be set. The advantage of such adjustable safety relief valves is that identical valves may be used for different situations calling for different set pressures. Also, the adjustability makes it unnecessary to manufacture relief valves to critical tolerance if the set pressure can be accurately adjusted once the valve is in place and the system is being tested.

All adjustable safety relief valves have several common elements. All have a body, or housing, an inlet and an outlet, a valve seat, a valve member, and a method of supplying an adjustable force to the valve member to prevent fluids from escaping past the valve seat. Most typically the method of adjusting the force is to rotate an adjustment screw, which in turn changes the compression of a spring member.

The desirable qualities of an adjustable safety relief valve include:
 (a) a crisp opening and closing action,
 (b) a high flow coefficient,
 (c) a low blow down,
 (d) a high resolution of the set pressure (ease of adjustability),
 (e) reliability,
 (f) durability, and
 (g) a low cost.

A safety relief valve with a crisp opening action is one which goes from a closed position to a full open position as soon as the set pressure is reached, rather than simmering and slowly opening wider as the pressure further increases. U.S. Pat. No. 4,446,886 to Taylor et al. identifies a method of achieving a crisp opening action by using a huddling chamber: a valve seat and valve member with an increased effective cross-sectional area once fluid starts to flow past the valve seat. A crisp opening makes the valve better serve its purpose of relieving pressure once the pressure gets above the safe point. A crisp closing is beneficial for a similar reason. Once the pressure is reduced, the valve should close rather than allowing more pressure (and the associated fluid) to escape.

The flow coefficient is the ratio of flow through a valve in an open position to flow of the same material and at the same pressure through an orifice the same size as the inlet to the valve. A high flow coefficient means that once the valve opens, there is very little impediment to the escape of fluid and the reduction of pressure. If the flow coefficient is small, a larger valve is needed to make sure that temporary pressure increases can be relieved fast enough to maintain pressures in a safe zone.

The blow down of a valve is the difference between the set pressure and the pressure at which the valve closes. For example, if a valve is set to open at 100 psi, but remains open until the pressure drops to 80 psi, it has a 20% blowdown. While some blowdown is necessary so that the valve does not repeatedly open and close with a pressure near the set point, a large blow down means that the pressure is being reduced much lower than is necessary, with the associated loss of fluid.

The remaining three factors, reliability, durability and cost, relate to practical aspects of valve usage. It is preferable that a valve be reliable and durable, lasting for as long as possible, with a minimum cost. Mechanical simplicity often means a lowr initial cost and less to go wrong. Durability is a function of the material used in construction, but also of the design.

There are several major types of adjustable safety relief valves, each with its own advantages and disadvantages.

Larger sized safety relief valves are usually flanged and have a disk shaped valve member. Illustrative examples of a flanged-disk type valves are depicted in U.S. Pat. Nos. 2,517,858 and 2,821,208 to Farris. In this type of valve, the valve housing is divided by a guide member which holds the valve member in alignment with the valve seat. A stem attached to the valve member extends through the guide member into a compartment containing a spring. On top of the spring is a compression member which is forced down by turning an adjustment screw threaded in the valve housing. Such valves are very high in cost, but have very high flow coefficients (0.975) and good blow down factors (5-7%). They typically have poor opening characteristics and only fair durability, though they have fairly good set pressure resolution.

Set pressure resolution is primarily a function of the spring constant of the spring used. Springs that are weaker (or less stiff) have less of a set pressure change for a given amount of extra compression, which is generally equivalent to a given number of turns of the adjustment screw. Thus, a greater number of turns are required to change the pressure a given amount, and a finer accuracy can be obtained. One problem with using long, weak springs is that, unless supported and guided, they may buckle while being compressed. As a result, some sort of spring guiding is necessary to avoid erratic value action. Outside diameter guiding is common, using a separate guide member surrounding the outside of the annular area occupied by the spring to prevent spring bucking.

Smaller relief valves generally have a threaded body and are of two predominant types: a piston/sleeve type and a ball type. An example of a piston/sleeve type valve is depicted in U.S. Pat. No. 3,572,372 to Moore. In this type of valve the valve member is aligned with the valve seat using a sleeve which extends below the valve seat. When the valve member lifts to let pressure escape, fluid flows out of the sleeve through holes in the walls of the sleeve. The bottom part of the sleeve stays around the inlet forming member. The pressure on the valve member is adjusted by turning an adjustment screw, which is threaded in the top of the valve housing. Riding up and down with the adjustment screw is a compression member on top of the spring. This type of valve is generally fairly high in cost, has good flow coefficients (0.93-0.95), has fair to poor blowdown characteristics (10-25%), poor set pressure resolution, and fair to poor durability. A major problem with the piston/sleeve type of valve is that undesirable material may be present in the escaping fluid which frequently adheres to the cylindrical sliding surfaces preventing proper lifting action of the valve. As a result, this type of valve is totally unsuitable for fluids with contamination which may effect the slidability of the sleeve. In addition, any water or other fluids present around the sleeve may freeze and cause the valve to stick.

Examples of a ball type valve are depicted in U.S. Pat. No. 2,676,782 to Bostock et al. and U.S. Pat. No. 4,446,886 to Taylor et al. In these patents, the valve members are actually spherical. This shape makes it easy to keep the valve members aligned with the valve seats, the inside walls of the valve body generally holding the spheres in the approximate proper position. In both these examples, the spring tension is adjusted by turning an adjustment screw threaded in the top of the valve body, which in turn acts against a compression member. Ball type valves are generally characterized by low cost but very poor blowdown factors (20–50%) and flow coefficients (0.3–0.4). While many have a crisp popping action and good durability, they have only fair set pressure resolution.

There are many other designs which are similar to the ball valve in that the valve member is guided by the inside diameter of the valve body. This type of guiding is susceptible to the sticking problems of the sleeve type valve.

Beside some feature to align the valve member with the valve seat, most valves include some method of limiting the "lift" of the valve member when the valve opens. If the lift is limited, the mechanism aligning the valve member with the valve seat can be shorter. Without a lifting limiting feature, the aligning mechanism will have to extend far enough to match the maximum lift of the valve member.

While individual valve designs each have their particular advantage, no design has heretofore been known which makes it possible to incorporate all the various advantages in one valve. For example, crisp opening valves generally have a high blowdown. If a longer, weaker spring is desired to improve set pressure resolution, the valve body length must be increased at a significant cost. The low cost construction due to simple valve member guiding in ball valves results in poor flow coefficients. Large flanged disk type valves are overly complex and expensive to be reduced in size for smaller applications.

SUMMARY OF THE INVENTION

Due to its unique design, the adjustable pressure relief valve of the present invention is able to simultaneously achieve many advantages of the individual prior art valves. The valve of the present invention comprises a valve body having an inlet and an outlet, a valve seat associated with the inlet, a valve member configured to seal off the flow of fluids through the valve at the valve seat, an adjustment screw supported in the valve body to allow rotational but not longitudinal movement of the adjustment screw with respect to the valve body, a compression member connected to the adjustment screw and mounted within the valve body which moves longitudinally with respect to the adjustment screw when the adjustment screw is rotated, a resilient member biased between the compression member and the valve member and means for connecting the adjustment screw with the valve member to align the valve member with the valve seat.

Through the use of a longitudinally stationary adjustment screw, several advantages are obtained. First, the position of the adjustment screw with respect to the valve member does not change as the set pressure is adjusted. The result is that the adjustment screw can also be used to limit the lift of the valve member during valve opening and prevent valve chatter.

Second, the valve member can be aligned with the valve seat using the adjustment screw. In the preferred embodiment, a stem attached to the valve member extends into a hollow area inside the adjustment screw.

Third, when a helical spring is used as the resilient member, the adjustment screw can be used to guide the spring and keep it from buckling. This is referred to as inside diameter guiding, meaning the inside diameter of the annular area occupied by the spring is just slightly larger than the outside diameter of the adjustment screw. As a result, fairly long, weak springs can be used, which greatly improves the resolution of the set pressure. There is no need to place the spring above a guide member, as in flanged-disk type valves, hence the valve body need not be extraordinarily long to house this type of spring.

The shape of the valve member of the present invention also provides numerous advantages with respect to a crisp opening action and a low blowdown. For example, the valve member and valve seat of the preferred embodiment cooperate to form a huddling chamber and the valve member is cupped shape to redirect the flow of the fluid escaping past the valve seat at an angle of between 90° and 180°. These and other advantages, as well as the invention itself, will be best understood in reference to the drawings and detailed description of the preferred embodiment.

DETAILED DESCRIPTION OF THE PRESENTLY PREFERRED EMBODIMENTS OF THE INVENTION

Figure 1:
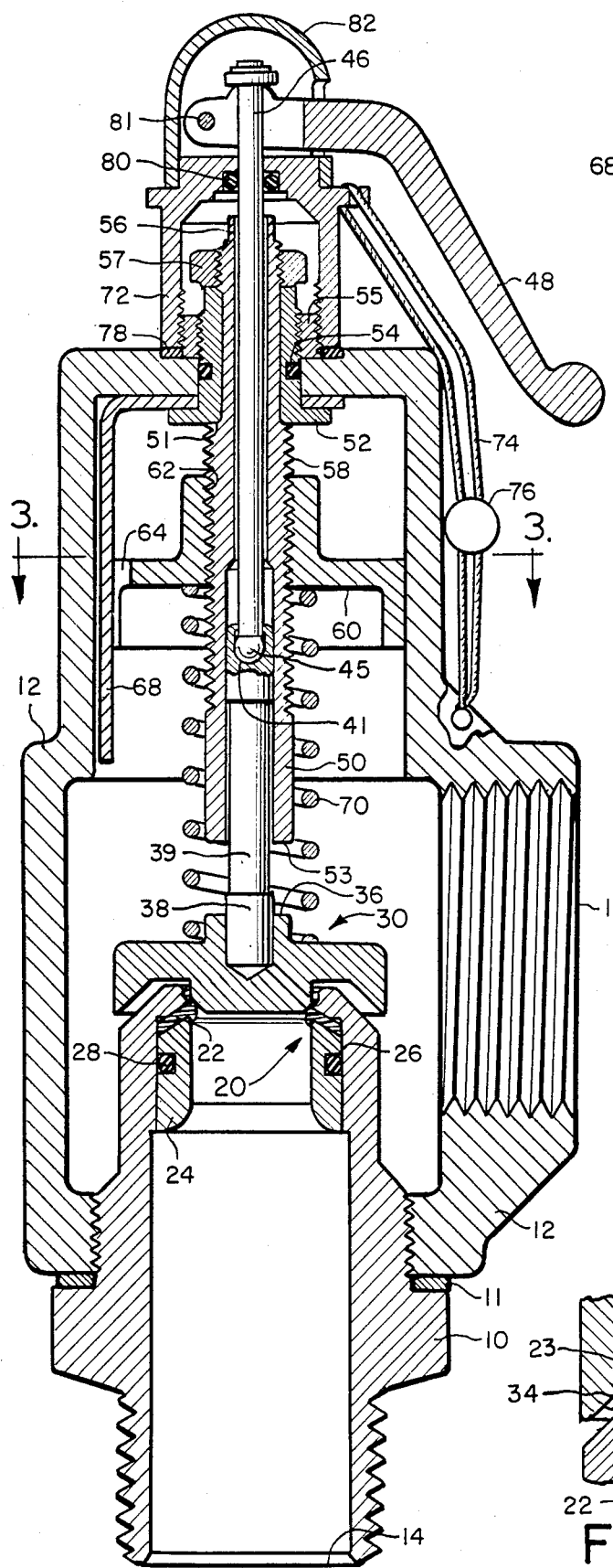
FIG. 1 is a sectional view of a cast body adjustable pressure relief valve, one preferred embodiment of the invention.

FIG. 1 shows one presently preferred embodiment of the invention made with a cast body. The adjustable pressure relief valve of FIG. 1 has a valve body made of two parts, a base 10 and housing 12. A soft metal washer 11 is placed between the two parts and helps seal the valve as the parts are screwed together. The base 10 has male threads so that the valve can be threaded into pressure vessels or pipelines. The base 10 has an inlet 14 through which fluids pass from the pressure vessel or pipeline into the valve body. The housing 12 includes an outlet 16 which has femal threads to which a pipe can be attached for conveying fluids discharged through the valve.

Figure 2:
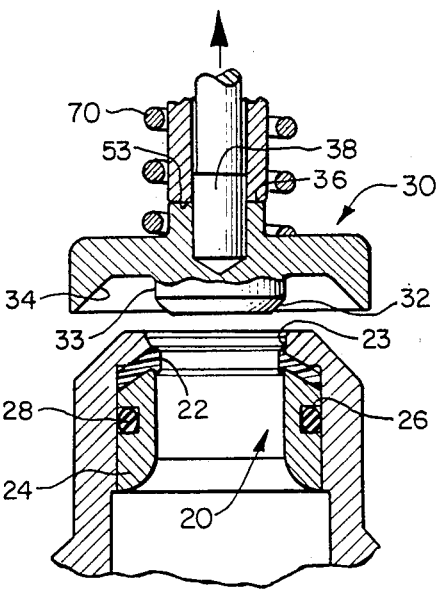
FIG. 2 is an enlarged sectional view of the valve and seat members of FIG. 1 in an open position.

Upstream from and associated with the inlet 14 is a valve seat 20, made up of several components. In this preferred embodiment, the construction of the valve seat 20 is exactly like the valve seat disclosed in U.S. Pat. No. 4,446,886 to Taylor et al. (hereinafter the '886 patent), which is hereby incorporated by reference. The seal ring 22, sleeve 24, groove 26, and O-ring 28 of FIG. 1 are exactly the same as and perform the same function as the seal ring 66, sleeve 56, groove 60 and O-ring 62 of the '886 patent. Upstream from the seal ring is a vertical section 23 (FIG. 2), not found in the '886 patent but performing a function similar to the bore 40 of the '886 patent.

Figures 2A, 2B:
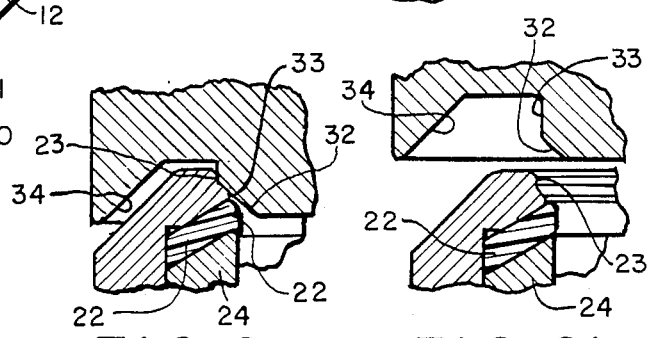
FIGS. 2a and 2b are enlarged sectional views showing (respectively) the closed and open position of the valve seat and valve member of FIG. 1.

As shown in FIG. 1, a valve member 30 sits atop the valve seat 20. The valve member 30 includes a sealing surface 32 having the shape of a section of a sphere, best seen in FIG. 2. The valve member 30 also includes a vertical section 33 which combines with the spherical shape of the sealing surface 32 and the vertical section of the valve seat 20 to create a huddling chamber. Once the pressure of the fluid, acting on the area of the valve member 30 encompassed by the sealing segment (the seal ring 22) of valve seat 20, exceeds the set pressure, the valve member 30 begins to open, exposing the remaining portion of the spherical surface 32, and hence its greater effective cross sectional area, to the fluid pressure (FIG. 2a). The vertical section 33 of the valve member 30, however, remains closely fit with the vertical section 23 on the valve seat 20 to prevent most of the fluids from escaping. The pressure of the fluid in the valve inlet 14 is able to act against the full diameter of the spherical surface 32, quickly increasing the force exerted on the valve member 30 and causing the valve to rapidly open as fare as possible. This full lift position is limited by the contact of the top surface 36 of the valve member 30 with the bottom surface 53 of adjustment screw 50. Once the vertical sections 33 and 23 separate (FIG. 2b), fluid is able to escape and impinge upon the fluid flow redirecting surface 34 of the valve member 30. The shape of the valve member 30 and the redirecting surface 34, as explained more fully hereafter, are important to the advantageous valve operating characteristics of the preferred embodiment of the invention.

As shown in FIG. 1, the valve member 30 also includes a stem 38. The stem 38 extends upward and slides within a hollow portion of adjustment screw 50. In the preferred embodiment, the stem 38 includes a necked down portion 39. This necked down portion 39 allows adequate free play for the spherical surface 32 to seat the valve member 30 as the valve is closed so that the vertical sections 23 and 33 will slide together.

In this first preferred embodiment, the stem 38 is connected to a lift rod 46 by a close fitting ball 45 and socket 41. The lift rod 46 is attached to a manual release lever 48 which pivots about a pin 81. Thus when lever 48 is raised, lift rod 46 and stem 38 lift valve member 30 away from valve seat 20, allowing fluid to escape.

The adjustment screw 50 is supported in a bearing 52 which extends through the top of the housing 12. Wrench flats 56 are provided to rotate adjustment screw 50. An O-ring 54 provides a seal between the housing 12 and the bearing 52. The adjustment screw 50 has a shoulder 51 larger in diameter than the bearing 52. This shoulder 51 prevents the adjustment screw from traveling longitudinally upward inside the valve body. The force exerted by spring 70 keeps the shoulder 51 against bearing 52, and prevents the adjustment screw 50 from moving longitudinally downward. Thus the adjustment screw 50 is supported in the valve body 12 to allow rotational, but not longitudinal, movement. As will be explained more fully hereafter, this feature allows for many of the advantages of the present invention.

Figure 3:
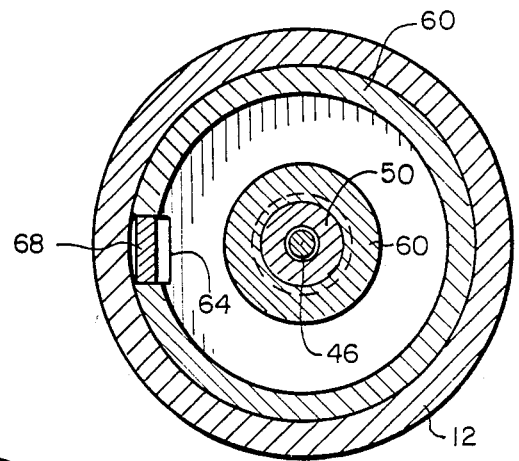
FIG. 3 is a sectional view taken along line 3—3 of FIG. 1.

A compression member 60, inside housing 12, rides up and down on adjustment screw 50 as its threads 62 engage adjustment screw threads 58. To prevent compression member 60 from rotating, it has a key way 64 through which a key member 68 extends (best seen in FIG. 3). Key member 68 is rigidly attached to the housing 12 by being tightened between the housing 12 and bearing 52 as nut 55 is tightened (FIG. 1).

Biased between compression member 60 and valve member 30 is a helical spring 70. The inside diameter of spring 70 is just slightly larger than the outside diameter of adjustment screw 50. Buckling of spring 70 during compressing is prevented by this inside diameter guiding of adjustment screw 50.

The pressure valve of FIG. 1 includes several additional features. A nut 57 is used to hold the adjustment screw 50 in place once the proper pressure setting has been obtained. A security cover 72 surrounds wrench flats 56 and securing nut 57. The security cover is attached to the housing 12 by a wire 74 with a seal 76 so that any tampering with the valve setting is prevented or immediately identifiable. Washer 78 seals between the security cover 72 and the housing 12. An O-ring 80 seals the lift rod 46 as it extends through the security cover 72. A dust cover 82 protects the connection of the manual lever 48 to the lift rod 46 and provides support for the ends of pin 53.

Figure 4:
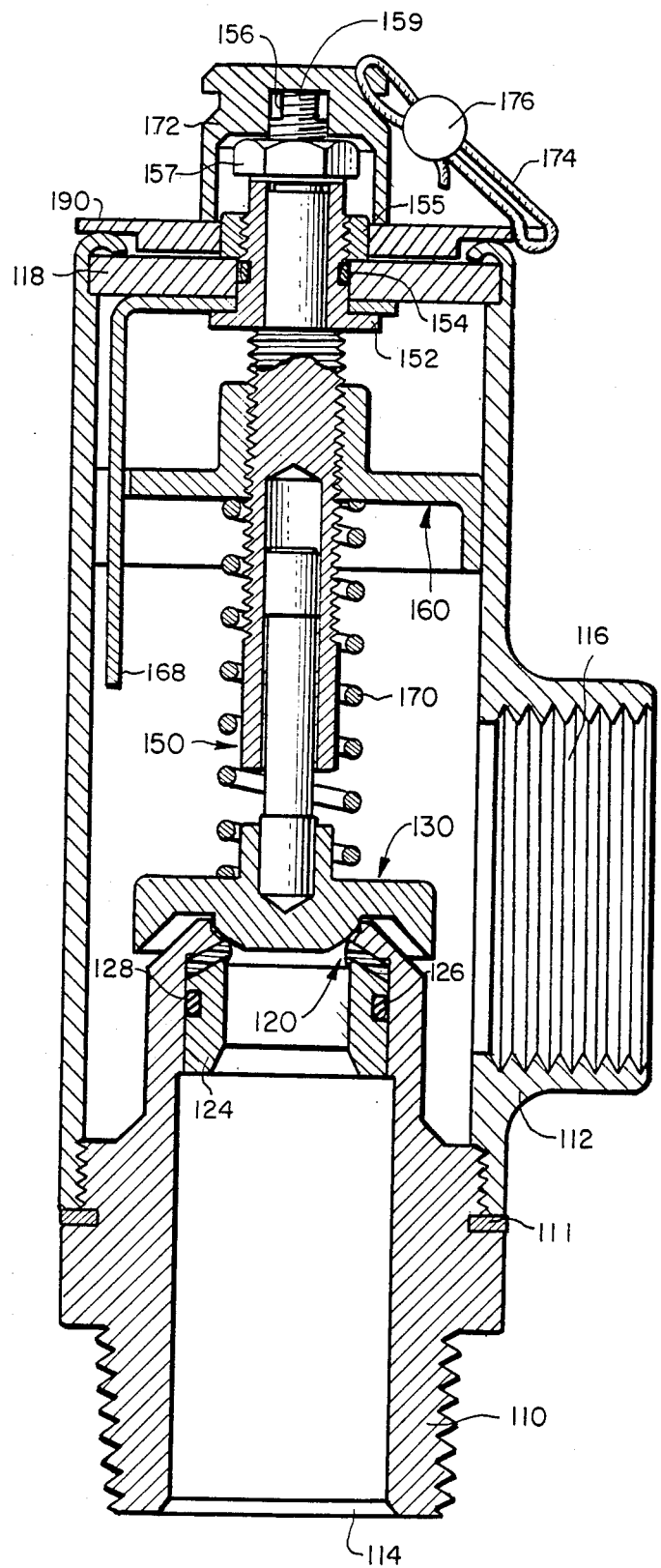
FIG. 4 is a sectional view of a fabricated body adjustable pressure relief valve, another preferred embodiment of the invention.

FIG. 4 shows another preferred embodiment of the present invention employing a fabricated body. For the most part the embodiments of FIGS. 1 and 4 are identical in internal structure. Thus reference numerals used in FIG. 4 refer to elements exactly like those in FIG. 1 with reference numbers differing by 100: the inlet 114, the outlet 116, etc. The design of FIG. 4 does not, however, include a manual lift lever, lift rod, dust cap or the sealing elements associated therewith. The fabricated body includes, beside the base 110 and housing 112, a top body member 118 which is held in place by crimping over the top edge of housing 112. A ring 190 is included to cover the top body member 118 and improve the appearance of the valve body. The security cover 156 screws onto threads 159 at the top of adjustment screw 150. These threads 159 are the same as the threads used to engage securing nut 157, though some of the threads 159 are removed during the machining of wrench flat 156.

Figure 5:
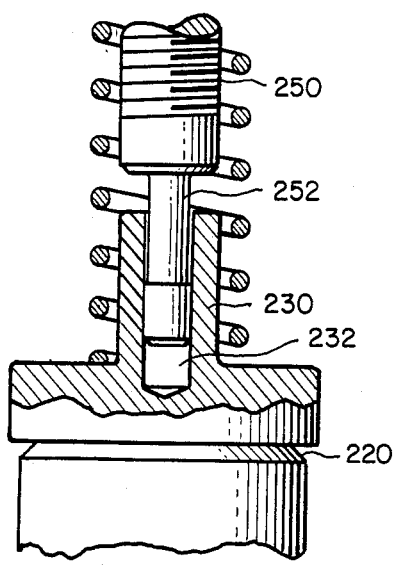
FIG. 5 is a partial sectional view of an alternate method of aligning the valve member of FIG. 1 or 4 using the adjustment screw.

FIG. 5 shows another method of connecting the valve member 230 with the adjustment screw 250 so that the adjustment screw 250 provides the guiding necessary to generally align the valve member 230 with the valve seat 220. Instead of a stem, the valve member 230 includes a hollow area 232 into which a stem 252 extending from the bottom of the adjustment screw 250 extends. The arrangement of FIG. 5 is not as suitable for valves with manual lift rods as is the design of FIG. 4 because the stem 252 would have to be hollow and thus not very sturdy, to allow a lift rod to connect to valve member 230.

In the preferred embodiments of FIGS. 1 and 4, the stable positioning of the adjustment screw 50 allows the adjustment screw 50 to be used to provide the gross alignment needed to bring valve spherical surface 32 in alignment with the valve seat 20. This method of alignment allows the valve member 30 to lift clear of valve seat 20 and leave a wide open discharge area radially downstream from the valve seat 20. No sliding guides are used; thus contamination in the fluid does not cause sticking in the valve operation. In addition, the valve has a high flow coefficient because there are not shroud member elements to restrict the flow.

The use of a stable adjustment screw 50 allows the end surface 53 of the adjustment screw 50 to serve as the stop surface for the full lift position. If the adjustment screw 50 moved longitudinally, the full lift position (and hence discharge rate of the valve) would vary with the set pressure, an unacceptable situation.

Because of the arrangement of the compression member 60 and the valve member 30, a relatively long, weak spring 70 can be used. This makes it possible to get fine resolution in the set pressure.

The use of a long spring 70 with easy set characteristics also is beneficial since variations in valve body dimensions can be more easily tolerated. Also, the repeatability of the opening set pressure is very good. All of this is accomplished without the need for additional components to provide outside diameter spring guiding, since buckling is prevented by inside diameter guiding, and without using an overly long housing 12, since the spring 70 is contained in the main portion of the valve.

The spherical shape of sealing surface 32 and soft valve seat using sealing ring 22 provides a "bubble tight" seal. The seat has excellent durability.

The low blowdown and crisp opening characteristics of the two preferred embodiments are primarily a result of the shape of the valve member 30 and valve seat 20 (which is the same for the embodiments of both FIGS. 1 and 4). The structure of the valve, primarily the longitudinally stationary adjustment screw, makes it possible to use a valve member with a shape yielding these advantageous operational characteristics. The design of other valve member shapes yielding other desired characteristics will also be possible using the structure of the valve of the present invention.

Figure 6:
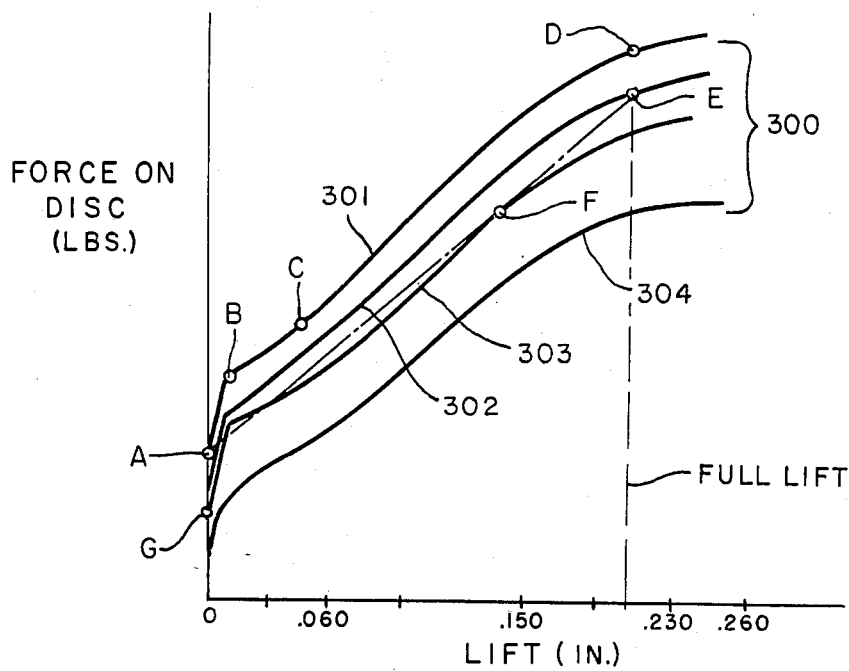
FIG. 6 is a graph representing force-displacement characteristics of the preferred embodiments of the invention.

FIG. 6 provides information useful in describing the operational characteristics of the valves of the present invention. The graph in FIG. 6 represents the total axial fluid forces on the valve member as a function of vertical lift position. When the valve is closed, only static pressure forces are at work. However, when the valve is open, the kinetic energy of the fluid flowing past the valve seat 20 and impinging on the valve member 30 adds additional forces. The totality of those forces are depicted by the curves on the graph of FIG. 6.

The family of curves 300, made up of curves 301, 302, 303, 304 and other curves not shown, are representative of fluid forces for different pressures (curves 301, 302, 303 and 304 representing four different pressures) acting against the same shape of valve member. Every orifice size and valve member shape would be characterized by a different family of curves.

Dashed line A-E represents the compression force of the spring 70. The line A-E for different springs would have different slopes, depending on the spring constant of the spring used. The position of the line A-E for the same spring would be shifted vertically by changing the amount the spring is initially compressed (the set pressure).

The relationship of line A-E and curves 301, 302 etc. is useful in determining what will happen to the valve member 30 at various pressures. For a curve (or portion of a curve) above the line A-E, a valve member at the indicated lift position and subject to a fluid at the pressure corresponding to that curve would be subject to a force exceeding the compression force of the spring, and would thus be accelerated toward the open position. For a curve (or portion of a curve) below the line A-E, a valve member at the indicated lift position and subject to a fluid at the pressure corresponding to that curve would be accelerated toward the closed position. When the curve intersects the line, the valve member subject to fluid at that pressure would tend to seek a lift position indicated by the point of intersection of the curve and line A-E.

The pressure curve 301 intersects the line A-E at point A, the fully closed position or zero lift displacement. Thus, for the compressed spring correlating to line A-E, the pressure of curve 301 is the set pressure of the valve. Any pressure over that pressure will exert a force exceeding the spring compression force at the zero lift position. Thus, at just above the set pressure, the valve member 30 will begin to open.

In operation, once the pressure acting against the small exposed area of the valve member 30 inside seal ring 22 creates a force greater than that at point A, the valve will begin to open. Immediately fluid can escape past the small sealing area but not past the vertical sections 33 and 23, which are machined to have a gap of only approximately 0.002 inches between them. Thus, the area on which the pressure acts increases, rapidly increasing the force applied by the fluid to point B. Since B is above the force-displacement curve of the spring, the valve continues to open. As the valve opens to the point C where the vertical portion 23 clears the vertical portion 33, static fluid pressure on the valve member drops, but is replaced by the kinetic force exerted by escaping fluids, especially due to the shape of fluid flow redirecting surface 34 of the valve member 30, which changes the direction of flow of the impinging fluid. In the preferred embodiment the outside portion of surface 34 is inclined at an angle of 45°. Thus, fluid escaping past the valve seat 20 is redirected in its flow direction about 135°. By having the flow redirected from at least 90° to 180°, the momentum of the escaping fluid is used to help lift the valve member 30. The full open limit of the valve, point D, is thus quickly reached, characterized by a crisp popping action. Thereafter, the valve remains full open until the forces caused by the escaping fluid are reduced to point E as the pressure drops to that corresponding to curve 302.

As the pressure in the inlet 14 continues to subside, the rate of flow decreases and the valve begins to close. The valve will close to the lift position on line A-E which intersects the succeedingly lower pressure curves (not depicted) between curves 302 and 303. Each pressure curve intersects the line A-E at lower and lower lift positions, until the point F is reached.

As can be seen from the shape of the family of curves 300, the curve for a pressure just less than the pressure for curve 303 does not intersect line A-E at any point near point F. As a result, the valve member 30 being acted upon by a fluid escaping from a vessel with a pressure corresponding to curve 303 and at a lift position just less than point F would be accelerated to a closed position. Because of the shape of curve 303, as the valve member 30 closes from point F, the drop in forces from the fluid exceeds the reduction in force from the expanding spring 20, further accelerating valve member 30. Thus, for appropriately shaped curves, even where the curve 303 does intersect line A-E again at a lower lift position, and even though the combined spring and fluid forces will then decelerate the rate at which the valve member is closing, the momentum of the valve member will cause the valve member to close past the huddling chamber portion where vertical portions 23 and 33 again confine the fluid, causing the valve member 30 to reseat, represented by point G.

The difference in pressure between curves 301 and 303 represents the blowdown of the valve. To obtain a low blowdown, it is advantageous that the spring be chosen so that the line A-E intersects the set pressure curve as near as possible to point D, the full lift position. In this manner, the set pressure will cause the valve to fully open, but the valve will begin closing as soon as the pressure is reduced below the set pressure.

The shape of the valve member is primarily responsible for the shape of the family of curves 300. The hudddling chamber portion contributes to the section of the curve from A-B, resulting in a crisp opening. However, a valve with a hudddling chamber generally closes slowly until the pressure is equal to the set pressure multiplied by the ratio of the area inside sealing ring 22 divided by the total huddling chamber surface area. At this point, the spring is strong enough by itself to push the valve member through the huddling chamber and cause it to reseat. This typically results in a high blow down.

By designing the valve member 30 so that a hump such as that at point F exists for the family of curves 300, the valve member 30 can reach a point where it will pick up some momentum in closing and thus close at a pressure higher than the low pressure typically required to allow the valve member to get back through the huddling chamber. This is due to the momentum the valve member picks up before it reaches the point of reintersection of the pressure curve and the line A-E. The shape of surface 34 of the valve member 30 is thought to primarily provide the hump at point F. Other angles of redirection and other shapes may be useful in different applications. Of course, a rounded shape could be used for surface 34, though it would be more difficult to machine. Dimensions defining the presently preferred shape for the valve with a one-half inch orifice in the fabricated body embodiment of FIG. 4 are depicted in FIGS. 7 and 8.

Figure 7:
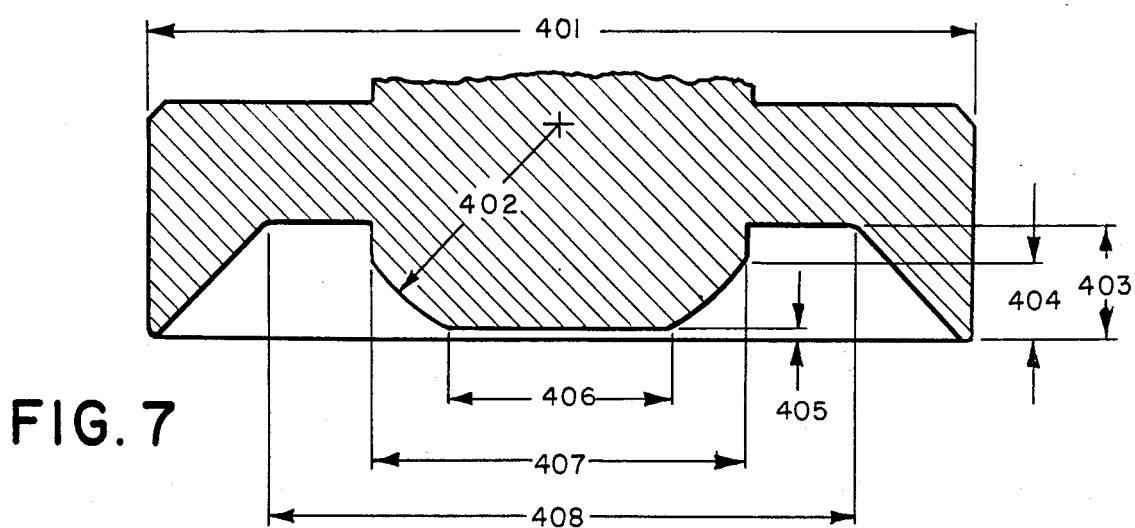
FIG. 7 is an enlarged sectional view of the valve member of the valve embodiment of FIG. 4.
Figure 8:
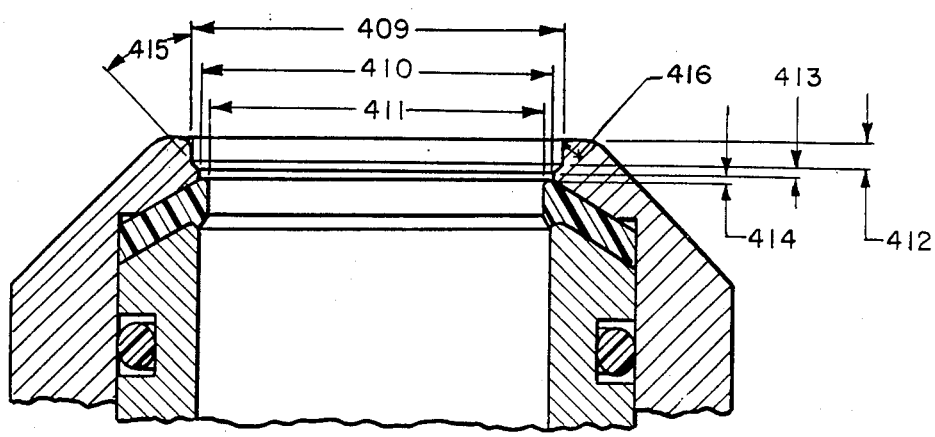
FIG. 8 is an enlarged sectional view of the valve seat of the valve embodiment of FIG. 4.

In the presently preferred embodiment, the dimensions of FIGS. 7 and 8 are as follows:

| | | |
|---|---|---|
| 401 - 1.375 inches | 407 - 0.616 inches | 413 - 0.034 inches |
| 402 - 0.375 inches | 408 - 0.970 inches | 414 - 0.012 inches |
| 403 - 0.190 inches | 409 - 0.618 inches | 415 - 40° |
| 404 - 0.129 inches | 410 - 0.560 inches | 416 - 0.020 inches |
| 405 - 0.012 inches | 411 - 0.520 inches | |
| 406 - 0.350 inches | 412 - 0.050 inches | |

In the preferred embodiments, the body is made of stainless steel, but could be made of mild steel or aluminum bronze alloy. The valve mamber 30, adjustment screw 50 and spring 70 are made of stainless steel. The compression member 60 is made of aluminum, as is the security cover 72. The nut 57 used to hold the adjustment screw 50 in place is the type having a hole on one side which can thus be loosened only with a spanner wrench, helping to make sure the set pressure is not inadvertently changed.

On the one inch fabricated body valve of FIG. 4, the stem 138 has a diameter of 0.375 inches, necked down at section 139 to 0.343 inches to allow free play for proper seating.

It should be understood that the preferred embodiments described in detail herein are illustrative of various aspects of the invention, and various changes and modifications to the presently preferred embodiments may be made while keeping within the scope of the present invention. Therefore the following claims, including all equivalents, define the present invention.

I claim:

1. An adjustable pressure relief valve comprising:
 (a) a valve body having an inlet and an outlet,
 (b) a valve seat associated with said inlet,
 (c) a valve member configured to seal off the flow of fluids through said valve at said valve seat,
 (d) an adjustment screw supported in said valve body to allow rotational but not longitudinal movement of said adjustment screw with respect to said valve body,
 (e) a compression member connected to said adjustment screw and mounted within said valve body such that rotation of said adjustment screw produces longitudinal movement of said compression member with respect to said adjustment screw, and
 (f) a resilient member biased between said compression member and said valve member;
 (g) said adjustment screw extending sufficiently close to said valve member and including an abutting section adapted to provide a full-open stop position to limit the lift of said valve member.

2. The valve of claim 1 wherein the compression member is keyed inside said valve body to prevent rotational movement but allow longitudinal movement with respect to said valve body.

3. The valve of claim 1 wherein the valve member comprises a spherically shaped sealing surface.

4. The valve of claim 3 wherein the valve seat comprises a resilient seal ring.

5. The valve of claim 1 wherein the adjustment screw provides an unchanging full open stop position for the valve member.

6. The valve of claim 1 wherein the valve member cooperates with the valve seat to provide a huddling chamber of an effective cross-sectional area greater than the area encompassed by the sealing segment of the closed valve seat once fluid begins to escape past the sealing segment of the valve seat.

7. The valve of claim 1 wherein said abutting section comprises the bottom of the adjustment screw.

8. The valve of claim 1 further including means for connecting said adjustment screw with said valve member, said connecting means and resilient member providing the sole contact with said valve member to align said valve member with said valve seat.

9. The valve of claim 8 wherein the adjustment screw includes a longitudinal bore and the valve member includes a stem, and said connecting means comprises said stem slidably mounted within said bore of said adjustment screw.

10. The valve of claim 9 wherein the stem is smaller in diameter in its mid-section than at its end slidably contained within said adjustment screw, the diameter of the end slidably contained within said adjustment screw being just slightly less than the diameter of the adjustment screw bore.

11. The valve of claim 9 further comprising a mamual relief lever wherein:
(a) said adjustment screw bore extends throughout the entire length of said adjustment screw and
(b) a lift rod is connected to said stem and slidably extends through said adjustment screw bore to connect to said manual relief lever.

12. In a safety relief valve with an adjustable relief set pressure having a valve body with an inlet and an outlet, a valve seat, a valve member and a spring assembly acting on said valve member to force said valve member against said valve seat; the improvement comprising:
(a) an adjustment screw rotatably supported within the valve body to prevent longitudinal movement of the adjustment screw with respect to the valve body and to impart changes in the tension in the spring assembly by rotation of the adjustment screw,
(b) said adjustment screw providing an abutting surface which limits the lift of the valve member from the valve seat, and
(c) the shape of the valve member and the valve seat cooperating to form a huddling chamber and the valve member being cupped shape to redirect the flow of the fluid past the valve seat at an angle of between 90° and 180° such that the valve member rapidly opens to abut against said abutting surface as soon as fluid begins to escape past the sealing segment of the valve seat.

13. The valve of claim 12 further comprising means for connecting said adjustment screw with said valve member such that said connecting means aligns said valve member with said valve seat.

14. The valve of claim 12 wherein said spring assembly comprises a helical spring and wherein said adjustment screw fits within the annulus of said spring and has a diameter sufficiently close to the inside diameter of said spring helix to provide inside diameter guiding.

15. An adjustable pressure relief valve comprising:
(a) a valve body having an inlet and an outlet,
(b) a valve seat associated with said inlet,
(c) a valve member configured to seal off the flow of fluids through said valve at said valve seat, said valve member including a stem,
(d) an adjustment screw rigidly supported in said valve body to allow rotational but not longitudinal or radial movement of said adjustment screw with respect to said valve body, said adjustment screw including a longitudinal bore into which the valve member stem slidably and tightly fits so that the valve member is aligned with the valve seat by the axially sliding connection between the adjustment screw and the valve member,
(e) a compression member connected to said adjustment screw and mounted within said valve body such that rotation of said adjustment screw produces longitudinal movement of said compression member with respect to said adjustment screw, said compression member also having a close sliding relationship with the inside walls of said valve body such that the compression member provides centering of the lower portion of the adjustment screw within the valve body, and
(f) a resilient member biased between said compression member and said valve member;
(g) wherein there is no guiding of the valve member as it moves from a full open position to a position contacting the valve seat except that which is imparted to the valve member due to said rigid support of the adjustment screw in the valve body.

* * * * *

UNITED STATES PATENT AND TRADEMARK OFFICE
CERTIFICATE OF CORRECTION

PATENT NO. : 4,799,506

DATED : January 24, 1989

INVENTOR(S) : Wesley L. Taylor

Page 1 of 2

It is certified that error appears in the above-indentified patent and that said Letters Patent is hereby corrected as shown below:

Column 2, line 3, delete "blowdown" (both times) and substitute --blow down-- (both times).

Column 2, line 12, delete "lowr" and substitute --lower--.

Column 2, line 48, delete "bucking" and substitute --buckling--.

Column 3, line 19, add --low-- before "flow".

Column 4, line 49, delete "FIG." and substitute --FIGS.--.

Column 5, line 25, after "section" please insert --23--.

Column 5, line 40, delete "fare" and substitute --far--.

Column 9, line 28, delete "hudddling" and substitute --huddling--.

UNITED STATES PATENT AND TRADEMARK OFFICE
CERTIFICATE OF CORRECTION

PATENT NO. : 4,799,506
DATED : January 24, 1989
INVENTOR(S) : Wesley L. Taylor

It is certified that error appears in the above-indentified patent and that said Letters Patent is hereby corrected as shown below:

IN THE CLAIMS

Col. 11, claim 11, line 5, delete "mamual" and substitute --manual--.

Signed and Sealed this

Twenty-ninth Day of November, 1994

Attest:

BRUCE LEHMAN

Attesting Officer    Commissioner of Patents and Trademarks